United States Patent [19]

Sampson

[11] 4,309,609
[45] Jan. 5, 1982

[54] HEAT SCALING OF TRAVELING ARTICLES

[76] Inventor: Norman N. Sampson, 5461 Las Lomas St., Long Beach, Calif. 90815

[21] Appl. No.: 110,230

[22] Filed: Jan. 7, 1980

[51] Int. Cl.³ .............................................. G01J 1/00
[52] U.S. Cl. .................................... 250/341; 250/350; 250/355; 33/127
[58] Field of Search ............. 250/341, 355, 340, 359, 250/338, 349, 350; 73/15 FD, 861.05, 432 L, 151 S; 33/127; 219/121 L, 121 LZ; 166/64, 250; 356/383, 138, 153, 429

[56] References Cited

U.S. PATENT DOCUMENTS

| | | |
|---|---|---|
| 2,466,251 | 4/1949 | Martin .................................... 33/127 |
| 2,488,277 | 11/1949 | Falk et al. . |
| 2,581,209 | 1/1952 | Shepard et al. . |
| 2,603,688 | 7/1952 | Cole et al. ......................... 73/861.05 |
| 2,655,633 | 10/1953 | Minor et al. . |
| 3,015,062 | 12/1961 | George et al. . |
| 3,066,253 | 11/1962 | Bowers . |
| 3,555,879 | 1/1971 | Schroeer et al. ................ 73/15 FD |
| 3,566,478 | 3/1971 | Hurlston . |
| 3,807,228 | 4/1974 | Matzuk ............................. 73/861.05 |
| 4,041,610 | 8/1977 | Vesugi et al. ......................... 33/127 |

OTHER PUBLICATIONS

Piggen, "Use of Laser Beam to Remove Insulation", IBM Tech. Disclosure Bull., vol. 11, No. 7, Dec. 1968, p. 872.

Primary Examiner—Alfred E. Smith
Assistant Examiner—Carolyn E. Fields
Attorney, Agent, or Firm—William W. Haefliger

[57] ABSTRACT

Local heating is employed to scale a workpiece, the heat dissipating from the heated zones after such scaling.

2 Claims, 5 Drawing Figures

HEAT SCALING OF TRAVELING ARTICLES

BACKGROUND OF THE INVENTION

This invention relates generally to automatically scaling or measuring the length of workpieces, and more particularly concerns the employment of heat to scale lengthwise elongated workpieces such as traveling pipe.

In the past, devices and methods for scaling workpieces required that the workpiece be metallic; that it be magnetizable; that the magnetized portion of the workpiece be erased (which in turn required the use of erase means); and that the workpiece be free or relatively free of surface contaminant so that suitable magnetization might be achieved. Examples of such techniques are found in U.S. Pat. Nos. 2,655,633 and 4,041,610. Disadvantages include the problem of remanent magnetization or other marking which desirably must be erased or otherwise removed so as to avoid confusion with marks or magnetization added during later scalings of the same workpieces such as pipes; the difficulty of erasing such magnetization or marks; and the problem of surface contaminant build-up on the work (such as oil, grease, dust, oxidation, on oil well pipe) which adversely affects or interferes with magnetization or marking capability. Accordingly, there is a need for simple apparatus and method for scaling long articles, which does not require erasing or removal of scaling marks or magnetization, and which is not adversely affected by work surface contaminants.

SUMMARY OF THE INVENTION

It is a major object of the invention to provide a solution to the above prior problems and difficulties, and which is capable of scaling pipe in a simple and effective manner by employing heat. Basically, and in terms of method, the new method of progressively scaling or measuring elongated workpieces comprises the following basic steps:

(a) relatively traveling the work successively past first and second stations, (b) locally heating successively spaced apart portions of the work as they pass the first station, (c) detecting said locally heated portions of the work as they relatively pass the second station, (d) and controlling said local heating of the work as a function of said detection.

The controlling step is typically carried out to initiate such local heating in response to the detection step, the local heating being carried out for predetermined time intervals and interrupted between such time intervals. Further, a counter may be employed to count a number of cycles representing the number of heated portions of the work passing the second stage, so that the product of that number and the distance between the two stages is the scaled length of the workpiece.

Also, the heat added to the workpiece eventually dissipates, so that no erasing step is necessary; and the use of a laser beam for intense heat application will remove surface contaminants such as oil, grease and wet mud, as by vaporization, to enable direct heating of the work surface.

These and other objects and advantages of the invention, as well as the details of an illustrative embodiment, will be more fully understood from the following description and drawings, in which:

DRAWING DESCRIPTION

DETAILED DESCRIPTION

Figure 1:
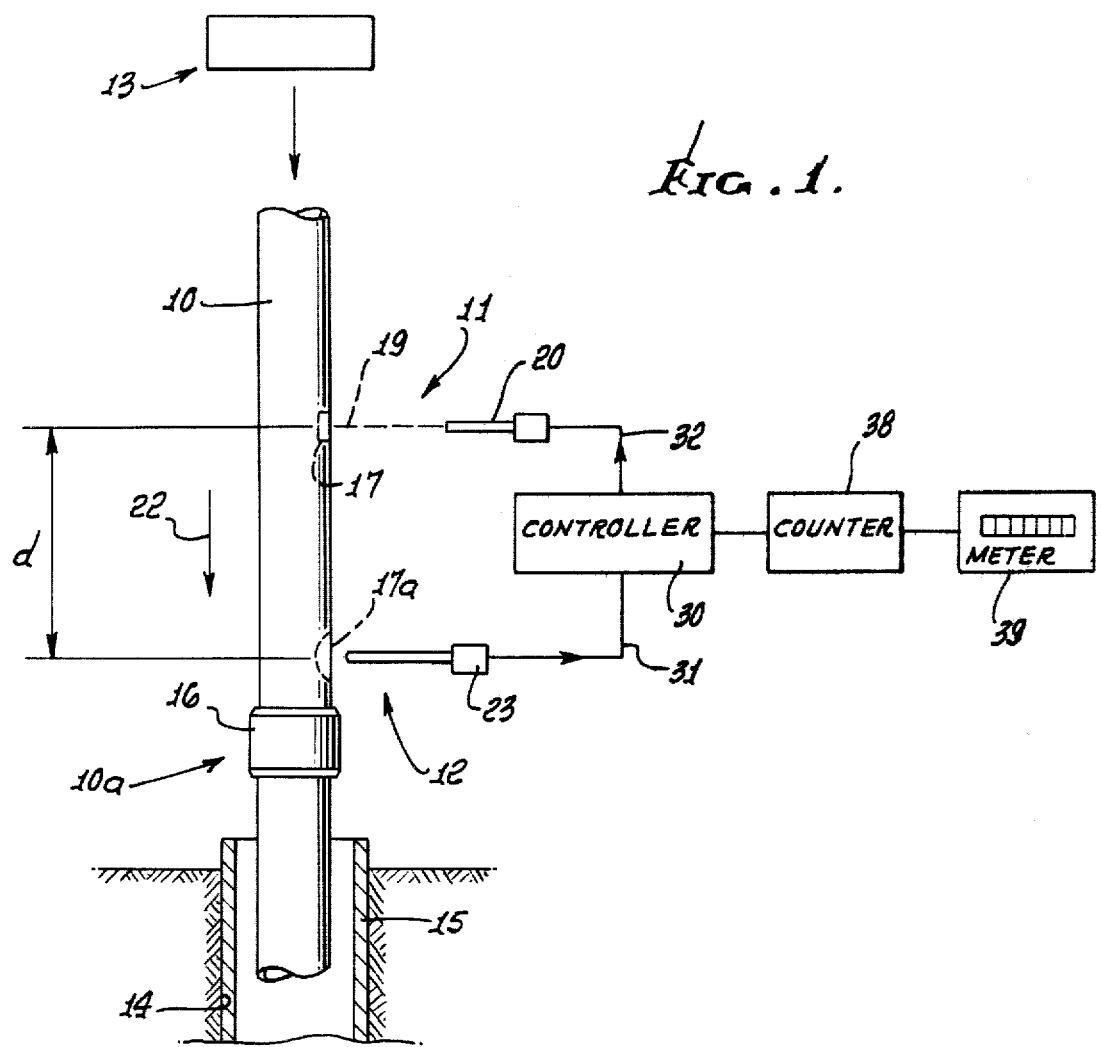
FIG. 1 is an elevation showing use of the invention.

Referring first to FIG. 1, a workpiece, as for example a metallic pipe string 10, is shown being traveled relatively past first and second stations indicated at 11 and 12. For example, a means 13 may support the pipe for lowering into a well 14, cased at 15. The means 13 may take the form of apparatus conventionally used to run a well pipe string into a well. Sections of pipe 10 may be made up, i.e. interconnected as at joints 16, to form a pipe string indicated generally at 10a.

The method of progressively scaling the work or pipe, in accordance with the invention, includes the step of locally heating successively spaced apart portions of the work as they pass the first station 11. Such local heating is typically carried out for predetermined time intervals, and is interrupted between such intervals, so as to produce the locally heated pipe portions 17 which face laterally and are spaced apart a predetermined distance "d". While various means may be employed to produce such local heating, one preferred means is a laser beam 19 produced by a laser apparatus 20. Beam 19 locally impinges on the pipe, as shown.

Figure 3:
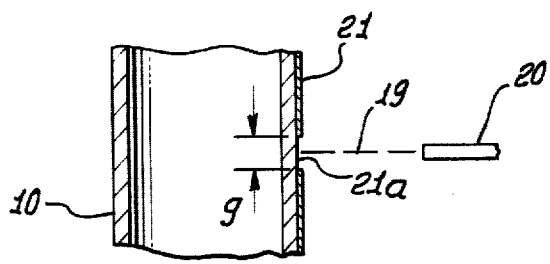
FIG. 3 is an elevation showing removal of surface impurities on a pipe, during local heating.

FIG. 3 shows the beam 19 directed at a surface coating 21 on the pipe to at least partly remove that coating so that the pipe metal may be locally heated. Note gap 21a in the coating 21 of a length "g" in the travel direction which corresponds to the product of the rate of travel the pipe and the time duration of laser impingement. Such a coating may consist of grease, mud, oil, or mixture of same, or other foreign material and the use of a laser facilitates removal of such material as by vaporizing or melting same, in a very short period of time. Typically, the pipe metal is locally heated to between 200° F. and 700° F., by a sufficiently intense beam.

Further steps of the method includes detecting the locally heated portions of the work as they relatively pass the second station 12 (with the pipe traveling in the direction of arrow 22); and controlling the described local heating of the work as a function of such detection. As to the latter control step, it is typically carried out to initiate the local heating in response to such detection, whereby spaced intervals "d" of fixed dimension will always be established between the locally heated portions of the pipe (as for example between their midpoints) despite changes in the rate of travel of the pipe relative to the station 11 and 12.

Figure 4:
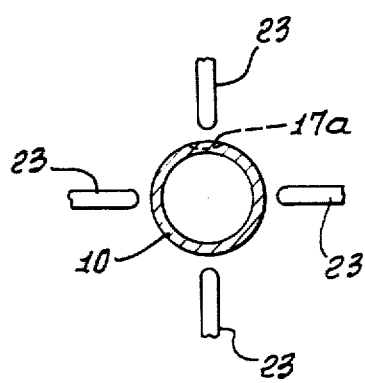
FIG. 4 shows several detectors spaced about a pipe at the same horizontal level.

Suitable known instrumentation 23 may be employed for heat detection purposes, the instrumentality 23 being shown directed laterally toward the traveling pipe, and beneath laser apparatus 20. FIG. 4 shows several such devices 23 spaced about the pipe at the same horizontal level, to ensure detection of the heated portion (represented at 17a in FIG. 1) despite possible rotation of the pipe as it is lowered in a well. Heated portion 17a is represented as slightly larger than portion 17 due to enlargement of that heated portion by outward heat conduction in the pipe during the time interval of pipe travel over the distance "d". In this regard, it is another and important feature of the invention that the heated portion 17 is self-eliminating, since the heat soon dissipates in the pipe metal, after passage of portion past station 12. This removes any necessity for auxiliary means to "remove" portion 17, as has previously been required as where portions of work are magnetized and must later be demagnetized.

The device 23 may for example include a thermistor or thermistors sensitive to infrared radiation outwardly from heated portion 17a, the thermistor located in a suitable circuit to provide a signal to control 30, as via lead 31. The control 30 in turn enables energization of the laser via lead 32, and for a predetermined time interval.

Figure 5:
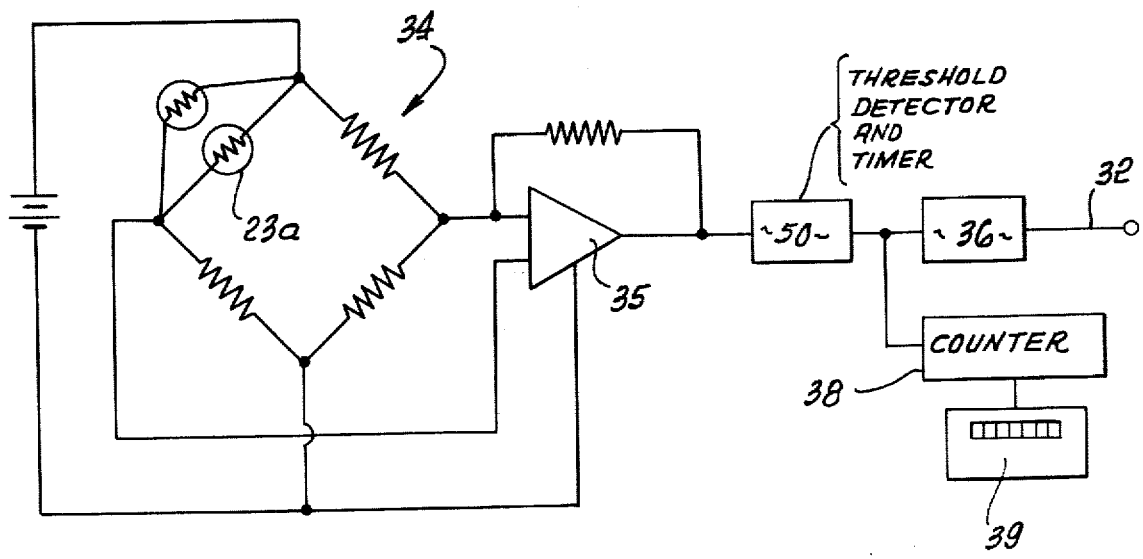
FIG. 5 shows associated circuitry.

In FIG. 5, a sensitive thermistor 23a or other electrical device (producing a charge in impedance or output signal as a function of heating) is shown connected in a bridge 34, the output of which is transmitted to operational amplifier 35. The output of the latter is transmitted to a threshold detector 50 which produces a pulse when the amplifier output reaches a predetermined level. That pulse energizes a laser drive and timer circuit 36 which energizes the laser for a predetermined time interval. The timing circuit may incorporate an RC network having a decay interval corresponding to the desired duration of laser operation. Other circuits may be employed to perform the overall functions of energizing the laser in response to detection of passage of a heated portion of the pipe, as described. A counter 38 is shown as connected to the controller 30, as for example as illustrated in FIG. 5, to count a number of cycles or intervals representing, or equal to, the number of heated portions of the work that pass station 12. The product of the count and the distance "d" represents the length of pipe run into the hole, and that product may be shown digitally on meter 39 connected to the counter. Meter 39 may incorporate suitable circuitry to multiply the count and a digital value of the distance "d" to produce the output. Another usable heat sensitive device is a thermopile.

Figure 2:
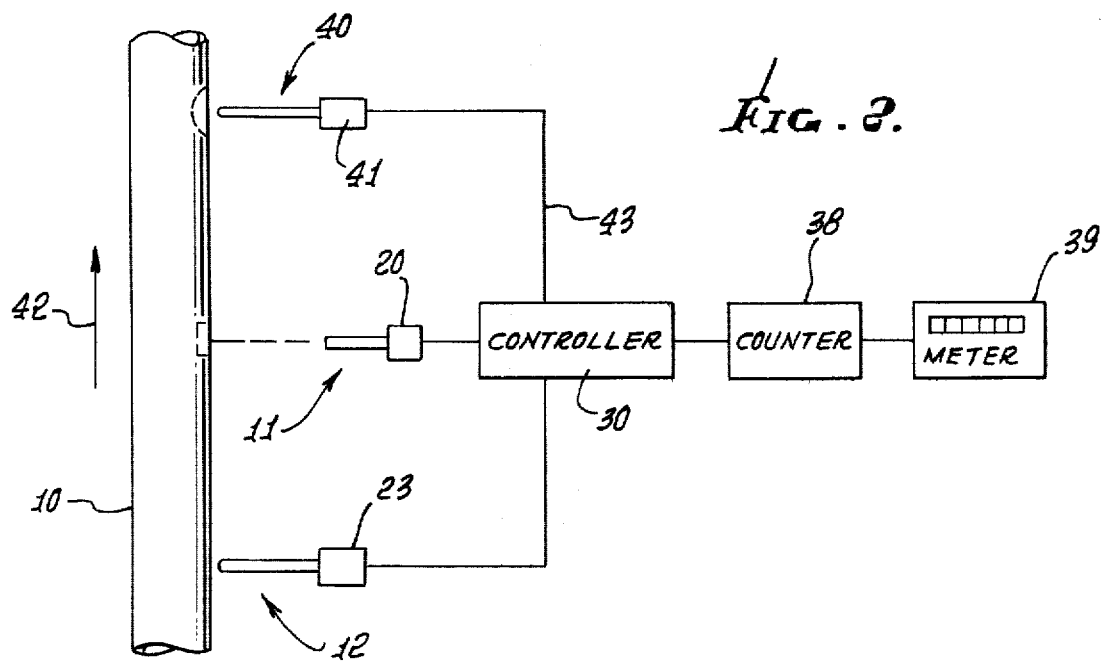
FIG. 2 is an elevation showing use of a modified form of the invention.

FIG. 2 illustrates a modified form of the invention wherein a secondary detection means at another or third detection station 40 is spaced at the side of the first station opposite the second station, for detecting locally heated portions of the work as they pass the third station. That third detection means may comprise an instrument or device 41 the same as device 23. It is shown in FIG. 2 as located above the heating means 20 to detect heated portions 17 of pipe 10 traveling upwardly in the direction of arrow 42. Thus, the apparatus of FIG. 2 is enabled to scale pipe 10 as it travels into or out of a hole, i.e. in either direction. Device 41 is connected at 43 with controller 30 in the same manner as device 23 is connected to the controller.

A commercial example of laser 20 is a $CO_2$ laser produced by Coherent, Inc., Palo Alto, Calif. Another is a so called "YAG" laser. (Yttrium, Aluminum, Garnet).

I claim:

1. In the method of progressively scaling elongated work, in the form of a metallic well pipe string being run into or out of an underground well, the steps that include (a) relatively traveling the work successively past first and second stations, and also rotating the work during said traveling,
   (b) locally heating successively spaced apart side portions only of the work as they pass the first station by transmitting a laser beam onto said work, there being a coating on the work, and said beam transmission being carried out to locally remove said coating, said local heating increasing the temperatures of said side portions to between 200° F. and 700° F., and the laser beam being of sufficient strength to achieve said temperatures of said work side portions,
   (c) detecting said locally heated portions of the work as they relatively pass the second station by operating multiple heat sensor means proximate the work,
   (d) and controlling said local heating of the work as a function of said detection, said controlling carried out to initiate said local heating in response to said detection,
   (e) said local heating being carried out for predetermined time intervals and being interrupted between said time intervals,
   (f) said (c) step including detecting the temperature of different side extents of the work at loci normal to the work axis,
   (g) and including the step of dissipating heat from said portions of the work after they pass said second station.

2. In apparatus for progressively scaling elongated work which is rotatable as it travels lengthwise, the work comprising a metallic well pipe string, the combination comprising
   (a) heating means including a laser at a first station directed at the work travel path for locally heating successively spaced apart side portions of the work as they pass the first station, the laser being of sufficient strength to achieve temperatures between 200° F. and 700° F. at said local side portions,
   (b) primary detection means at a second station spaced from said first station for detecting said locally heated portions of the work as they pass the second station, said detection means including multiple heat sensors spaced about the work in the same plane normal to the work travel direction and directed at different side extents of the work and located proximate the travel path of the work, and secondary detection means at another detection station spaced at the side of said first station opposite said second station for detecting said locally heated portions of the work as they pass said other station,
   (c) control means operatively connected to said heating means and said primary and secondary detection means for controlling said local heating of the work as a function of said detection by either of said detection means, and for continuing said local heating for predetermined time intervals, said control means including circuitry to initiate said local heating in response to said detection,
   (d) and a counter connected with said control means to count a number of cycles representing the number of said heated portions of the work passing said second station, and said other station.

* * * * *